Aug. 4, 1959
E. DAMOND
2,897,956
VIBRATING CHUTES
Filed March 31, 1955
3 Sheets-Sheet 1
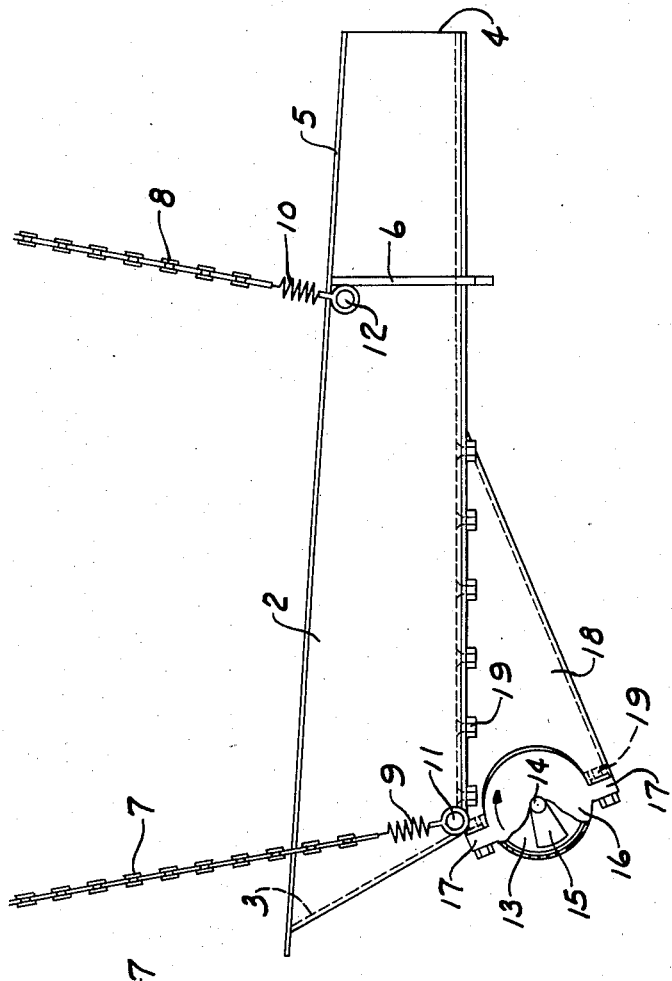
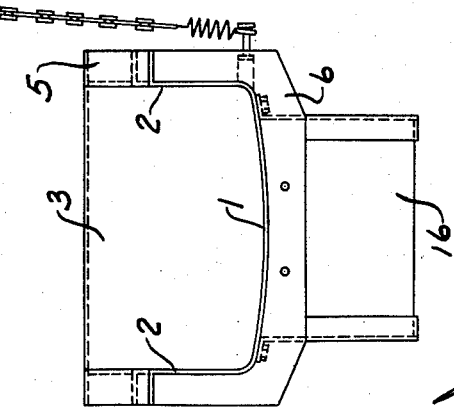
INVENTOR.
EMILE DAMOND
BY
HIS ATTORNEY

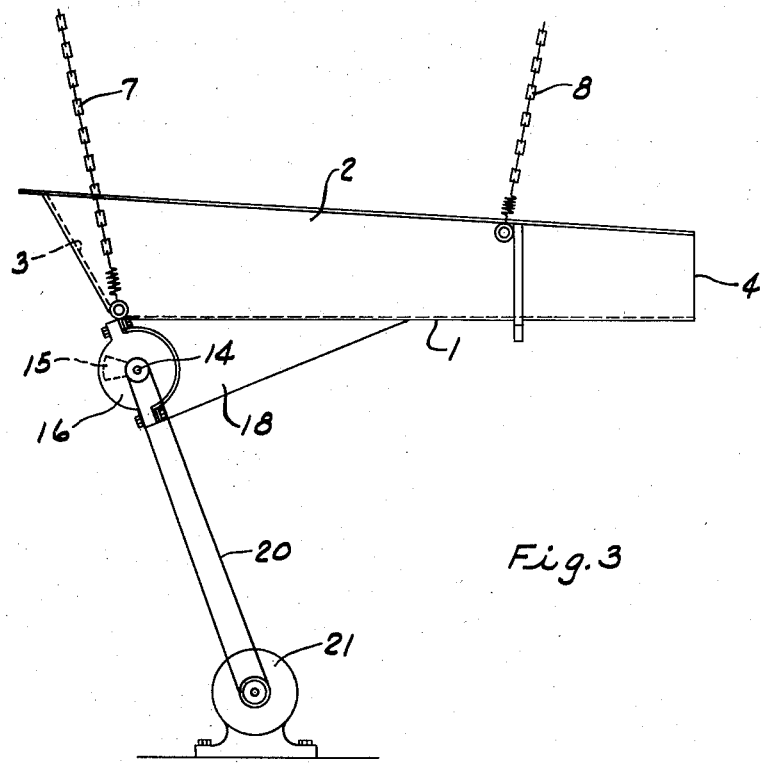
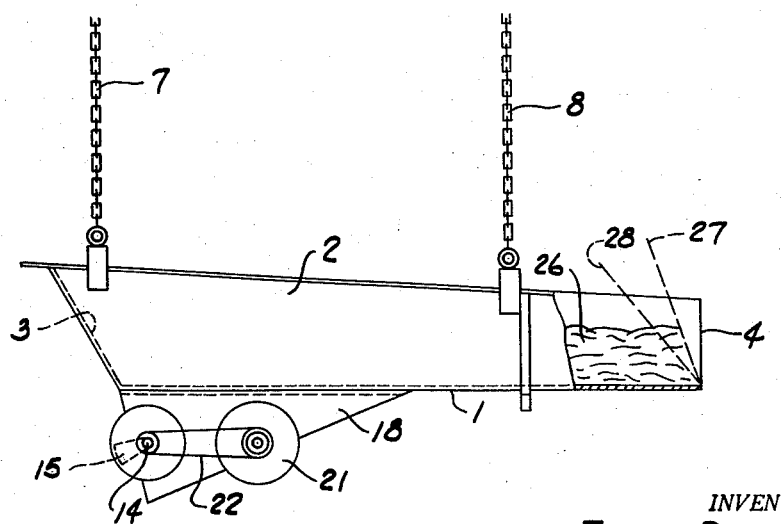

Aug. 4, 1959                E. DAMOND                 2,897,956
                         VIBRATING CHUTES
Filed March 31, 1955                              3 Sheets-Sheet 3

INVENTOR.
EMILE DAMOND

HIS ATTORNEY

United States Patent Office 2,897,956
Patented Aug. 4, 1959

2,897,956
VIBRATING CHUTES
Emile Damond, Paris, France
Application March 31, 1955, Serial No. 498,413
2 Claims. (Cl. 198—220)

This invention relaes to a vibrating chute.

It is known to use vibrations to ensure the progression of articles or of a granulated or pulverized material in a chute, the bottom of the latter being solid, or consisting of a screen if it is a question of a material which has to be screened. In both cases, the effect produced on the material resting on the bottom of the chute should be the same as that of a periodic force, inclined upwards and downwards, so that a component perpendicular to the bottom of the chute accelerates the material by detaching it therefrom and a component parallel to the bottom of the chute accelerates the material in the direction in which it is meant to advance.

The inclination of the periodic force transmitted to the material by the bottom of the chute can be determined by the direction of bending of resilient supports of the chute or it may result from the fact that a vibration generator is used which produces a directional vibratory force and which is fixed to the chute and orientated in such a manner that the direction of said force is inclined upwards and downwards in relation to the bottom of the chute. This is why, when it is impossible to ensure the inclination of the vibratory force by using a resilient suspension bending in the direction which this force should have, as is the case with vibrating chutes suspended from rods or chains which are placed under hoppers to regulate their output, vibration generators producing a directional force have hitherto been used exclusively. Those which are most commonly used are electro-magnetic vibrators. They have the disadvantage, however, of being heavy and clumsy and of consuming a great deal of current.

The object of the present invention is to provide a non-directional vibrator, in which the vibration results from the continuous rotation of an eccentric mass, to set a suspended or supported chute vibrating in such a manner that the material advances regularly along said chute in a predetermined direction, even if the chute has an ascending slope.

According to the invention there is provided a suspended or carried vibrating chute wherein the vibration generator comprises a rotary vibrator having an axis transverse to the chute and rigidly fixed under the bottom of the chute close to one end thereof by means of a rigid frame which extends approximately half-way along the chute, the section of which frame decreases starting from the position of the vibrator. The rotary vibrator may be held on each side by two parallel triangular side plates fixed by their longest sides by known mechanical means under the chute, parallel to its length.

It has been found that the vibrator transmits to the chute a vibration such that the material advances in a continuous fashion, moving further away from the vibrator. It has also been found that the advancement retains this direction whatever the direction of rotation of the shaft of the vibrator, but that it is more rapid when the direction of rotation is such that the portions of the path of the weights of the vibrator nearest to the chute are traversed by the weights in the direction in which the material advances along the chute. This advancement persists even when the chute is inclined with an upward slope of up to about 10%.

According to the invention a rotary vibrator can be used which is very simple in construction and is lighter and has a lower power consumption than the known directional vibrators, particularly electro-magnetic vibrators. It follows that by using a vibrator in accordance with the invention, it is possible to obtain vibrating chutes which are economical both as regards their construction and as regards their operation.

It is known that vibration is transmitted very badly to powdered substances of very low density and that these substances cannot be transported in vibrating chutes except in very thin layers. Moreover, powdered or granular materials form a sloping mass at the outlet from the chute and observation shows that this mass has a steeper slope during the vibration than at rest. Consequently, when it is desired to end the distribution, a certain discharge continues even after stopping the vibrator.

It is a further object of the invention to provide means for increasing the delivery during the operation of the vibrator and at the same time to limit the amount of material discharged after it has been stopped, and also means enabling the vibrator to be slowed down and stopped at a precise moment, for example when the distributor is supplying an automatic balance.

The first means consist in dividing up the height of the lower portion of the chute by means of a certain number of horizontal partitions which form superimposed chute units, the total delivery being that of all these chute units. As the vibrations are transmitted equally to all the chutes, the total delivery is increased. Moreover the total volume comprised between the planes of the sloping masses of the material on the various chute units during vibration and at rest is less than it would be in the absence of the horizontal partitions dividing the thickness of the flow.

The means which, according to the invention, permit the slowing down of the distribution and the precise stopping thereof, and which are particularly advantageous for automatic weighing, consist in using a vibrator fed with alternating current and in connecting a line of direct current to the windings of the motor by means of a commutator controlled by a relay, said relay being in turn controlled by a detector device of known type subject to the action of the passage of the needle of the balance in front of a sensitive device. Preferably two sensitive devices are provided, one short of the position which the needle should reach for the exact weight controlling the relay for switching over from alternating current to direct current, the other at the exact weight controlling a relay which short-circuits a potentiometer in the D.C. circuit, said potentiometer being regulated in such a manner that at first the direct current only causes a slowing down of the vibrator, but that at the exact weight, the D.C. voltage is sufficiently high to stop the slowed-down vibrator. The direct current is preferably obtained by rectifying alternating current derived from the ordinary feed circuit.

Several embodiments of a vibrating chute according to the invention are hereinafter described, by way of example, with reference to the accompanying drawings, in which:

Fig. 1 shows one embodiment of a vibrating chute seen endwise from the end where the material emerges;

Fig. 2 is a side view of the chute shown in Fig. 1;

Fig. 3 shows a modification of the vibrator device;

Fig. 4 shows another modification;

Figure 5:
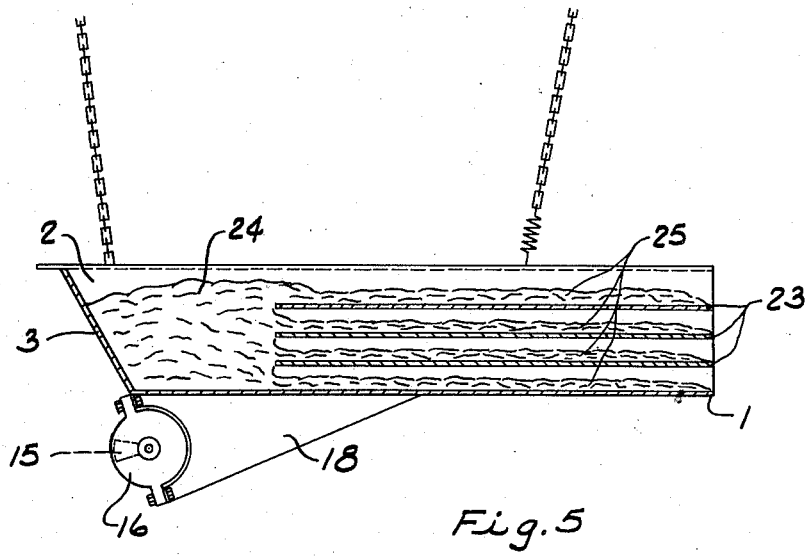
Fig. 5 shows a chute divided downstream into superimposed part chutes.

According to the embodiment shown in Figs. 1 to 4, the vibrator is fitted to a vibrating distributor, that is to say to a relatively short, solid-bottomed chute, intended to be suspended under the outlet of a hopper to regulate its delivery.

As shown in Figs. 1 and 2, a shaped, solid sheet of metal forms the chute with a bottom 1 and sides 2; between said sides, the bottom rises obliquely at 3 to form one end; the other end 4, which is open, forms the outlet from the chute. The edges of the sheet metal form stiffening flanges 5. An intermediate rib 6 joins these flanges. The assembly is suspended on each side from two chains, one at the rear 7, the other 8, level with the rib 6, preferably fixed by means of springs 9 and 10 to eye-bolts 11 and 12 rigidly connected to the chute.

The vibration generator consists of a rotary vibrator. It may, for example be a squirrel-cage electric motor 13, the rotor-shaft 14 of which carries weights such as 15 at each end, keyed onto the shaft at the same angle, the whole being contained in a casing 16 having fixing strips 17, and being fixed by said strips at the end of a rigid frame 18 formed by two parallel webs of thick sheet metal with turned-back edges. These webs in the form of a triangle, here shown right-angled, receive the vibrator on their smallest side. The strips 17 are bolted at 19 to the flanges of said sides. The webs are firmly fixed under the bottom 1 of the chute by the flanges of their longest side. This fixing may be done by welding, but preferably by means of studs 19' welded under the bottom 1 and evenly spaced, thus enabling the longitudinal position of the vibrator frame under the chute, to be regulated within certain limits by longitudinal displacement by the distance between studs.

The frame, fixed under the chute by means of nuts, transmits to the chute the vibrations generated in the vibrator, and experience shows that a powered or granular material poured onto the chute near its rear wall 3 advances continuously towards the outlet 4 with a regular delivery. This is so whatever the direction of rotation, but the advance is more rapid if this direction is that indicated by the arrow (Fig. 2), that is to say directed towards the outlet 4 in the part of the path of the weights 15 which is closest to the bottom 1. In a modification illustrated in Fig. 3, the vibrator 16, mounted on the rigid frame 18 fixed to the bottom 1 of the chute, comprises only the shaft 14 carrying the weights 15. This shaft is connected by a belt 20 to a separate electric motor 21 resting on the ground, the direction of the belt being substantially perpendicular to a straight line joining the shaft 14 to the end of the frame.

As the modification shown in Fig. 4 shows, the separate motor 21 may also be carried by the frame 18 at a certain distance from the shaft 14 on which the weights 15 are keyed and connected therewith by means of a belt 22 or by any other suitable transmission.

The speed of the motor or the transmission ratio may be variable so as to enable the frequency and the delivery to be regulated. The amplitude may be modified by changing the moment of the weights 15.

Chutes serving a hopper should have a high output. Experience has shown, however, that, particularly when it is a question of low density material, the vibration is not transmitted satisfactorily to the heart of the material so that a satisfactory speed of advancement can only be obtained if the material is in a thin layer.

In order to increase the output it is possible, as shown in Fig. 5, to divide the height of the downstream portion of the chute as far as its outlet by means of superimposed partitions 23, parallel to the bottom 1 and evenly spaced. The mass 24 of material poured into the upstream portion of the chute is then divided up between the various chute units arranged in tiers, which participate equally in the vibrations of the apparatus as a whole, and it advances in thin, superimposed layers 25, so that the output is multiplied by the number of chute units. Even in the case of relatively dense material, delivery takes place more evenly.

Another advantage of the arrangement with chute units is improved precision in stopping the distribution when the vibrator is stopped. Observation shows that at the outlet of a vibrating chute (see Fig. 4), a layer of transported powdered material 26 runs out during vibration with a slope 27 which is steeper than the natural slope 28 of the material in the absence of vibration. It follows that when the vibrator stops, the volume of material comprised in the dihedron formed by the slope planes 26 and 28 still flows out. When the layer is divided up into thinner layers on chute units, then assuming that the sum of the thicknesses of these layers is equal to that of one undivided layer, the total volume of material running off after stopping will be less, as can easily be verified by comparing the total sections of the amount running off in the two cases. These sections are actually similar triangles and their areas are proportional to the square of their similar dimensions, for example, the thickness of the layer. As this thickness is in inverse proportion to the number of unit layers, the total volume running off the unit layers is also in inverse proportion to the number of unit layers. The amount of material still falling after the vibrator has stopped is therefore reduced in proportion to the number of chute units.

Figure 6:
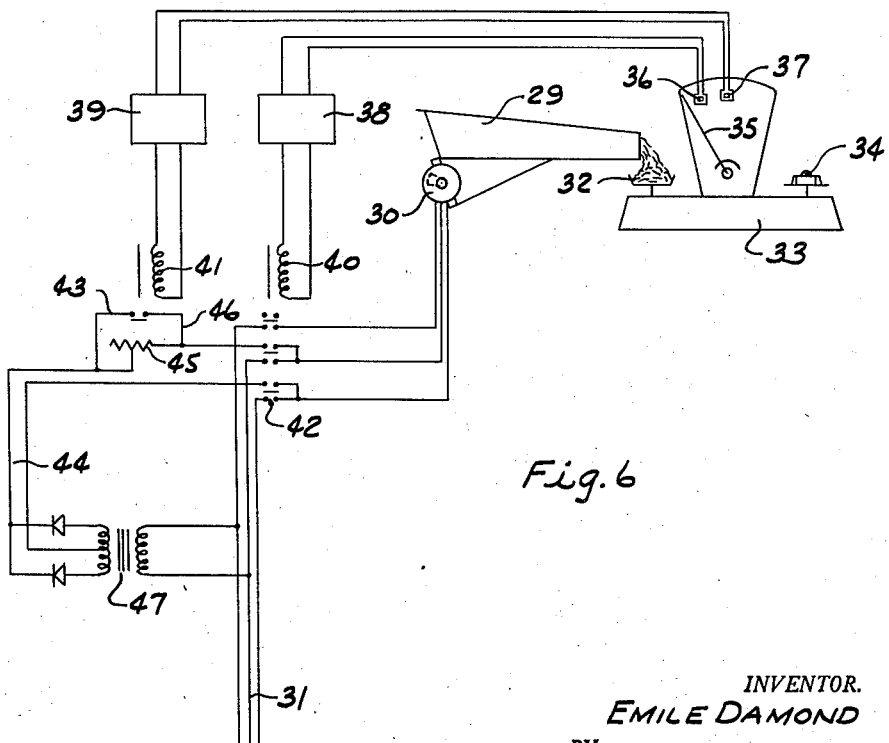
Fig. 6 is a diagram of a weighing device comprising means to automatically control the vibrator.

Fig. 6 shows a device for controlling the distribution of material, by means of a vibrating chute, to a balance which carries out automatic weighing. The chute 29 is set in vibration by means of a vibrator 30 fed with 3-phase current from the line 31 and discharging above the weighing pan 32 of a balance 33, the other pan 34 of which carries the weight corresponding to the weighing to be effected. The pointer 35 of the balance meets on its path, two sensitive devices 36 and 37 of any known type, photo-electric cells, induction coils or the like, forming part of two detector circuits 38 and 39 controlling respectively the windings 40 and 41 of two contactors 42 and 43. The first contactor 42 comprises contacts which are normally closed for the three phases of the 3-phase supply and, when it is energised it opens these contacts and provides the connection for a two-wire D.C. circuit 44 including an adjustable potentiometer 45. The second contactor 43 comprises an interruptor contact which is normally open, for short-circuiting the potentiometer via the wire 46. The direct current may be taken from the 3-phase supply by means of a transformer rectifier unit 47.

The sensitive devices 36 and 37 are adjustable in position, the latter occupying the position corresponding to the exact weight and the former preceding it in the direction of displacement of the pointer. As long as the pointer remains in its position of rest, the windings 40 and 41 are not energised, and the D.C. circuit is open, as is the contact 43, while the 3-phase circuit is closed. The motor 30, fed with 3-phase current, causes, by its rotation, the vibration of the chute, and the material being supplied, falls onto the pan 32 of the balance, which it loads progressively. When the pointer leaves its position of rest and passes in front of the first sensitive device 36, the winding 40 is energised and the contactor 42 interrupts the supply of 3-phase current to the motor and switches two of the wires over to the D.C. supply 44 by means of the potentiometer 45, the short-circuit line of which remains open. The potentiometer is adjusted so that the D.C. voltage applied is sufficient to effect moderate braking of the motor without causing it to stop.

The material therefore continues to be supplied, but more slowly, until the pointer reaches the second sensitive device 37. The winding 41 is then energised and the contact 43 closes, thus short-circuiting the potentiometer 45 so that the windings of the motor receive a D.C. voltage sufficient to cause the immediate stopping of the vibrator. Needless to say, the value of this voltage may be regulated, if necessary, by means of a second potentiometer (not illustrated) inserted in the line 44. All delivery of material therefore stops when the needle reaches the exact weight. Actually the slope of the material at the end of the chute is modified progressively as the vibrator slows down and, if the slowing down is adequate, it has already reached its natural slope when at rest at the moment when the vibrator stops.

The means described above make it possible to obtain all the precision desirable in weighing while the period of slowing down the motor may be regulated both by the spacing of the sensitive devices 36 and 37 and by adjustment of the potentiometer 45.

The same slowing-down and stopping device may, of course, be used in the control of any vibrating chute and it should be understood that the general expression "vibrating chute" which has been used throughout the specification does not necessarily apply to an apron with a solid bottom but may comprise aprons of any kind with perforated bottoms, riddles, screens, etc.

What I claim is:

1. A material handling apparatus of the vibratory chute type that comprises a trough-like chute open at the rear end to receive a mass of loosely held particles of material, means for vibrating the chute in directions to move the material forwardly through the chute, for discharge thereof at the forward end of the chute, horizontally disposed partitions located in relatively-spaced relation in the chute adjacent and extending from the discharge end thereof rearwardly for a distance less than the length of chute and in a position where their rear edges will be engaged by the mass of material and divide it into multiple vertically-spaced layers for advancement from the rear end to the front end of the chute.

2. Apparatus as recited in claim 1, wherein the discharge ends of its partition are all in a common plane at the discharge end of a chute.

References Cited in the file of this patent

UNITED STATES PATENTS

| | | |
|---|---|---|
| 1,858,328 | Heymann et al. | May 17, 1932 |
| 2,144,382 | Lincoln et al. | Jan. 17, 1939 |
| 2,292,327 | Lincoln | Aug. 4, 1942 |
| 2,429,864 | Alvord | Oct. 28, 1947 |
| 2,539,070 | Gebo | Jan. 23, 1951 |
| 2,637,434 | Harper | May 5, 1953 |
| 2,694,156 | Cerminara | Nov. 9, 1954 |